Feb. 7, 1967    P. J. PLATZER ET AL    3,302,769
BULK MATERIAL SAMPLER
Filed April 14, 1965    2 Sheets-Sheet 2

INVENTORS
PETER J. PLATZER
EMIL H. ANDERSON
RICHARD O. SELENSKI
BY
Schroeder, Siegfried & Ryan
ATTORNEYS United States Patent Office 3,302,769
Patented Feb. 7, 1967

3,302,769
BULK MATERIAL SAMPLER
Peter J. Platzer, Minnetonka, and Emil H. Anderson and Richard O. Selenski, Richfield, Minn., assignors to Dean Gamet Manufacturing Company, Minneapolis, Minn., a corporation of Minnesota
Filed Apr. 14, 1965, Ser. No. 448,077
9 Claims. (Cl. 198—43)

Our invention relates to sampling devices and more particularly to an improved sampling device particularly adaptable for use in connection with bulk materials which are normally conveyed with belt type conveying apparatus.

While material sampling devices are well known and may take varying forms, bulk material samplers for materials which must be protected against breakage, bruising, and mechanical deformation, both in the conveying and sampling apparatus, require special sampling devices. Our invention relates to such a sampling device which may be particularly adaptable to the sampling of fruits, vegetables and other materials which must be reasonably protected against mechanical breakage, deformation and the like. In sampling devices of this type, it is difficult to obtain a representative sample and to handle the material being sampled. Our improved sampling device is characterized by its simplicity in structure and that it may be applied to conventional conveying equipment for material of this type. It will also accurately and continuously effect a sampling without damaging such material.

Therefore it is an object of this invention to provide an improved bulk material sampling apparatus.

Another object of this invention is to provide an improved bulk material sampler which is particularly adaptable for sampling fruits, vegetables and other materials subject to damage in handling.

A further object of this invention is to provide in an improved bulk material sampler, a sampling tray which protects the material being conveyed and readily dispenses the sample.

A still further object of this invention is to provide apparatus of this type which is simple in design, economical to manufacture and easy to maintain.

These and other objects of this invention will become apparent from a reading of the attached description together with the drawings wherein:

FIGURE 4 is a schematic circuit diagram of the energizing circuits for the motors of the sampling device.

Figure 1:
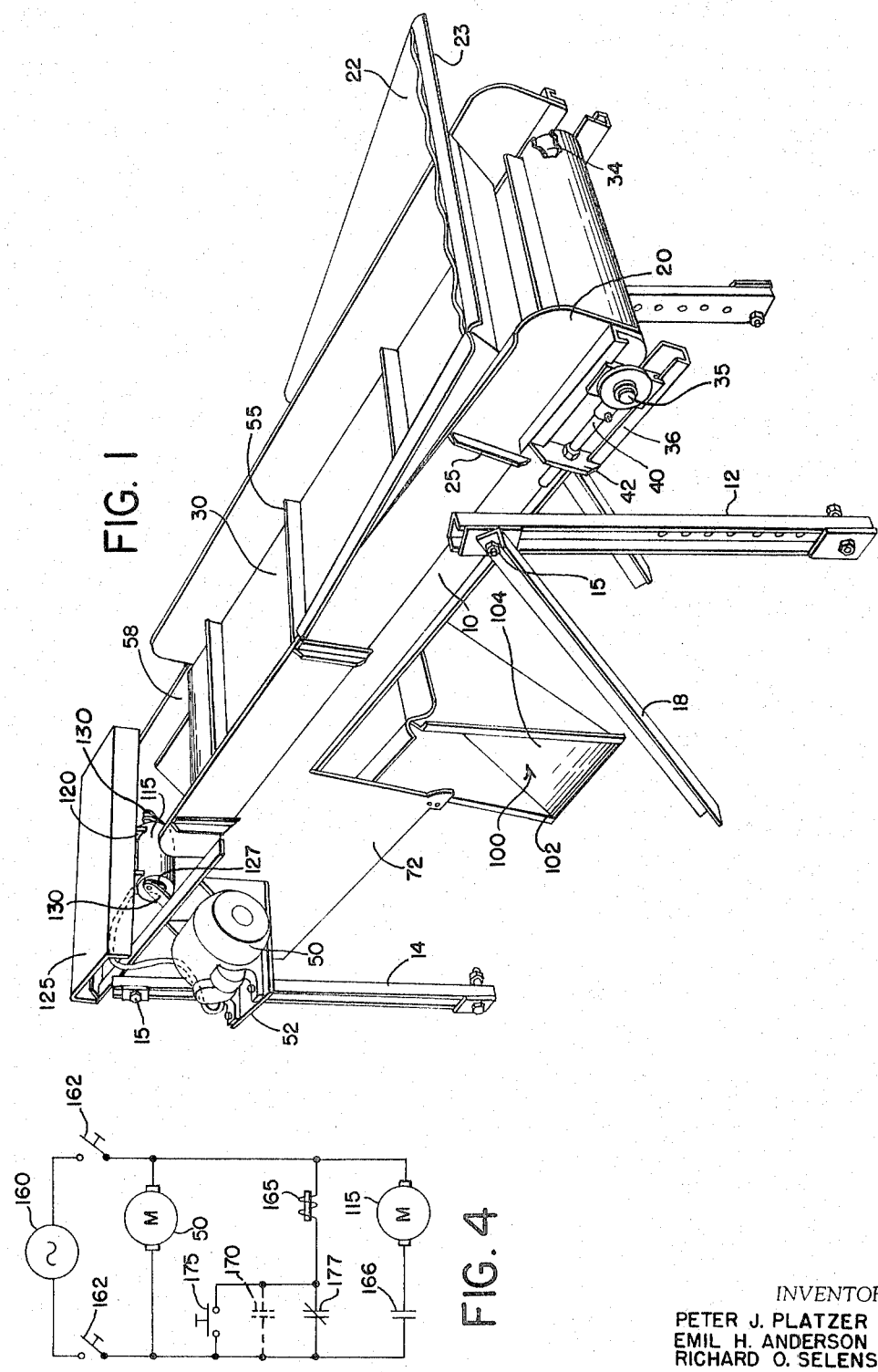
FIGURE 1 is a perspective view of the improved bulk material sampler.

Our improved bulk material sampler is shown in perspective in FIGURE 1 as having a base or frame section 10 with leg members 12 and 14 connected to the sides thereof through suitable means such as nut and bolt type connections 15. The base and legs form a platform which because of the length of the respective legs 12 and 14 is inclined toward the discharge end of the sampling device, as will be later defined. In addition to the legs 12, stabilizing legs 18 are included therewith to stabilize the platform. The base 10 has side members or plates 20 suitably attached thereto over substantially the entire extent of the base to form with a hopper frame 22, the inlet end of the sampler. The hopper frame has a raised extremity 23 and is suitably connected to the side panels 20 through means not shown which in turn are suitably connected to the base such as by the flanges 25.

Positioned on the base is a continuous belt conveyor 30 comprised of a drive roller 33 at one extremity and an idler roller 34 at the other extremity which rollers are suitably secured in the base frame. As will be seen in FIGURES 1 and 2, the conveying belt 30 extends over and around the rollers and the idler roller 34 is mounted at one extremity of the frame through slidably mounted journal members 35 positioned in channel guides 36 in the frame. The journal members 35 are adjustably positioned in the slots through adjusting members 40 threaded through a flange member 42 attached to the base 10. The drive roller is similarly mounted in journals, not shown, which are not laterally adjustable and are connected to a drive motor 50 mounted on a transversely projecting flange 52 attached to the base member 10. The conveying belt 30 is made of a flexible material, such as heavy rubber material, and includes upwardly projecting rubber flange members 55 in spaced relation thereon which extend across the width of the conveyor belt 30. This conveyor belt extends substantially over the axial extent of the rollers and fills the spacing between the side plates 20 to form the floor of the hopper.

Figure 2:
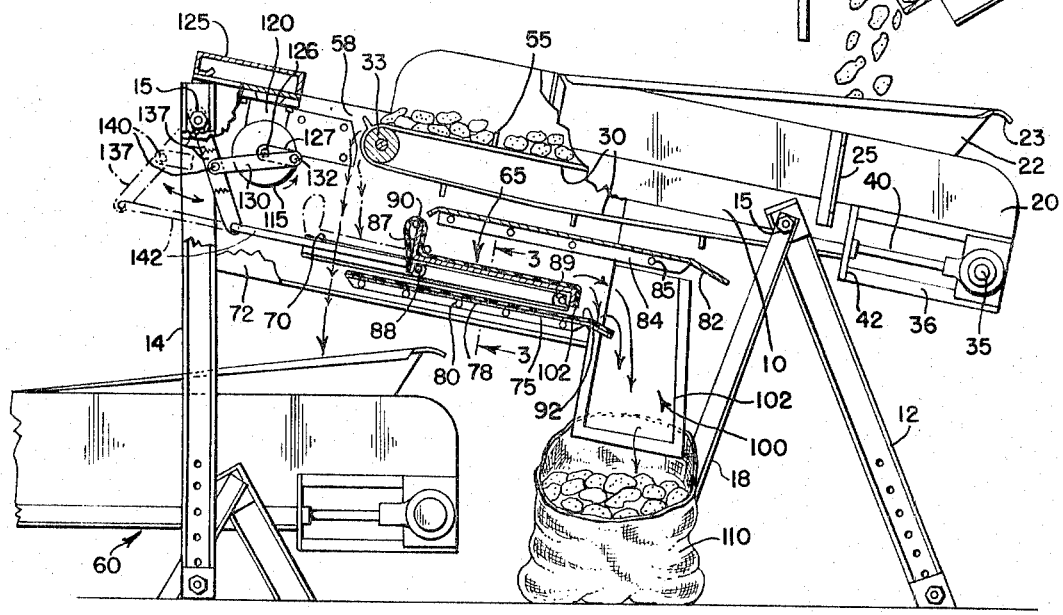
FIGURE 2 is a side elevation view of the improved bulk material sampler with parts in section showing an application of the same.

The length of the conveyor is spaced from the extremity of the frame which mounts the support legs 14 and the side plates 20 extend along the side of the conveying belt up to this point. The spacing therebetween, as indicated at 58, represents the discharge end of the conveyor and, as will be seen in FIGURES 1 and 2, the material on the conveying belt will under certain circumstances be allowed to fall free to a subsequent transfer apparatus, such as a second conveying belt indicated at 60 in FIGURE 2. As will be best seen in the side elevation view of FIGURE 2, the conveyor belt 30 is so positioned on the frame and the base is so positioned on the legs, that the conveyor belt of the sampling device is inclined toward the discharge end of the same. Thus, as seen in FIGURE 1, the base 10 of the sampling device is enlarged or deeper as at 72 to enclose and mount a sampling tray and hopper as will best be seen in FIGURE 2. As indicated in FIGURE 2, a sampling tray indicated generally at 65, is slidably mounted in a pair of channel like guide members 70 suitably secured to the enlarged portion 72 of the base. Positioned beneath the channel guide members is a baffle 75 which extends between the enlarged portions 72 of the base and is suitably secured thereto at flange portions 78 through suitable means such as screws 80. Positioned above the sample tray 65 and below the conveyor is a second baffle 82 which similarly extends across the width of the sampling device between the enlarged portions 72 and is suitably secured thereto at the flange portions 84 through screw means 85.

Figure 3:
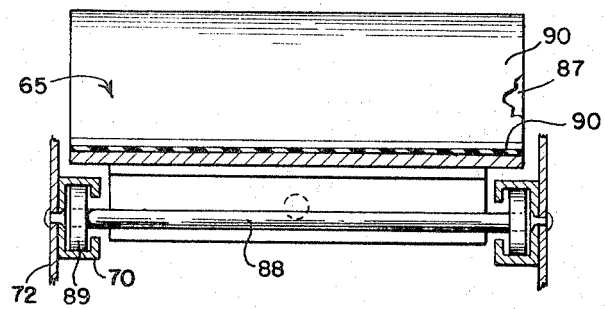
FIGURE 3 is a sectional view of the structure of FIGURE 2 taken along the lines 3—3 therein to show the sampling tray and its mounting.

As will be seen in FIGURES 2 and 3, tray 65 is formed with an upstanding end wall 87 which forms the back of the tray and the base of the tray mounts shafts 88 with rollers 89 thereon which rollers fit into the channel guide members 70 to be slidably mounted therein. A flexible rubber coating 90 is positioned over the projecting back wall 87 and across the top of the tray. Side walls are omitted herein since the tray fills the space between the enlarged portions 72 of the frame and the opposite extremity is open so that samples thereon may be moved onto the baffle 75 which also mounts a protective rubber coating 92 and into a sample hopper generally indicated at 100. The sample hopper is formed with three sides and an open face 102, the back side 104 being slanted such that the samples therein will be deflected through the hopper and the open face 102 of the same into a collecting point, such as a bag as indicated at 110 in FIGURE 2. The tray 65 acts to collect samples of the bulk material after they drop from the conveyor belt at the discharge end thereof when the tray is positioned beneath the same and to move the samples forward along the path of the guides to the discharge hopper 100 where the tray will be positioned beneath the conveyor. Baffle 82 above the tray protects against extraneous material from the conveyor belt from being dropped onto the tray at other than the discharge end of the conveyor belt and into the hopper since it provides a cover over the same. It will also be noted that the tray 65 is the same width as the conveyor such that it will accept samples from the entire width of the conveyor as a representative sample of the bulk material being conveyed at any particular period.

Tray 65 is operated by a motor 115 which is mounted through suitable brackets 120 to a protective flange 125 extending across the top of the enlarged frame portions 72 at the discharge extremity 58 of the frame to form a protective cover for the motor. Motor 115 is an electric motor having output shafts 126 at either extremity which mount respectively linkages 127 thereon (see FIGURE 1). The end of the linkages 127 is connected to floating linkages 130 such that the connecting extremity of the floating linkages 130 and the linkages 127, as indicated by pivot points 132, will move in a circular path to provide an eccentric action to a pair of pivoted levers 137 pivotally mounted on each side of the frame 10 and connected to floating linkages 130 at a pivot rod 140. The free extremity of the linkages or levers 137 includes shaft members 142 which extend along the sides of the base frame at the enlarged portions 72 thereof and are secured to the back frame 87 of the tray through suitable means such as nuts and bolts (not shown) to secure this extremity of the shaft thereto. The opposite extremity of the shafts 142 are pivotally connected to the extremities of the levers 137 so that the levers 137 may through the shafts 142 move the tray 65 back and forth in the guide rails 70 from a position underneath the conveyor to a position under the discharge end of the conveyor and back to the starting position adjacent the hopper 100. The floating linkages 130 through the connections with the levers 127 will provide an oscillating or eccentric type action from the circular rotation of the motor at the shafts 126 to oscillate the levers 137 back and forth in an arcuate manner. Slight freedom at the connection of the shafts 142 to the flange portion 87 of the tray permits flexing of the shafts to follow this arcuate movement. The connection of the levers 130 through the pivot rod 140 which extends between the levers 137 permits driving both levers 137 on either side of the sampling frame simultaneously and at the same speed. Thus there will be no binding in the movement of the tray through the rollers thereon as the tray is moved in the guides 70.

FIGURE 2 shows the outline of a dump body 150 of a truck (not shown) which is depositing bulk materials, such as potatoes or similar vegetable, into the inlet or hopper end of the sampling device, as an example of the location of the sampling device at the inlet to a bulk conveying line. Whenever the tray 65 is positioned beneath the conveying belt, the bulk material as it rides up the belt of the conveyor being urged through the webs or flanges 55 thereon will drop from the conveying belt of a sampler to a main conveying line such as indicated by the conveyor 60 in FIGURE 2 to be taken to suitable storage, processing, or bagging facilities.

It is desired under such conditions to periodically take a sample of the bulk material which will be representative of the load of bulk material being deposited into the conveying line for purposes of determining quality and other characteristics of the same. Thus the sample tray 65 will be caused to move up the guide rails 70 and into the path of the material being deposited from the discharge end of the sample conveyor to collect a representative sample of the bulk material. The tray will be moved to a maximum position such as determined by the throw of the levers 137 as they are driven by the rotary motor 115 through the connecting levers 127 to substantially block all flow of the bulk material into the main conveyor 60. As the motor 115 rotates, the levers will change direction and advance the tray in a direction beneath the conveying belt causing the samples dropping thereon to be advanced toward the hopper 100. The protective rubber covering 90 on the sample tray and 92 on the baffle protects the bulk material from damage due to jarring and the end of the tray as it advances will cause the bulk material on the baffle to be advanced into the discharge hopper 100 and discharged to the collecting point such as the bag 110.

In our improved bulk sampling apparatus, a single rotation of the sampling motor 115 will cause the lever systems to advance the tray from a position beneath the conveyor to a position beneath the discharge of the conveyor and back to the rest position beneath the conveyor. Normally, the samples are collected and discharged periodically with the motor being deenergized between sample taking and energized again at a given period thereafter at which time another sample is to be taken.

Thus as will be seen in FIGURE 4, the schematic electric diagram shows a power source 160 having a manually operated switch 162 therein included in each of the inlet conductors and representing the power source across which is connected the drive motor 50 for the conveying belt. Thus, whenever the switches 162 are closed, continuous power is applied to the motor 50 to provide continuous energization of the conveyor of the sampling device. In addition, motor 115 is energized through a relay 165 whose contacts 166 are in series with the windings of the motor 115 to control the application of power thereto. The relay 115 is controllably energized from a plurality of contacts, one of which is identified at 170 and may be connected into the circuit from a remote point to provide automatic operation of the sampler through a remote timer. In parallel therewith is a manually operated momentary type push button or switch 175 which supplies current to the relay 165 to turn on the motor. Also connected in parallel with these two contacts is a switch contact 177 which switch contact will be a limit switch either included with the motor or external thereof to limit the rotation of the output shaft to a single revolution. Thus the contact 177 will be normally closed and will be operated by a suitable flange (not shown) on the shaft whenever the motor is in the rest position to open the circuit therein. In this manner, once the line switch 162 is closed energizing the motor 50, sampling may be initiated manually through the momentary operation of switch 175 or periodically through the operation of switch 170 from a remote timer. The closure of either of the contacts 170 or 175 will energize the relay 165 which relay will pull in making its contacts 166 and will be sustained by the rotation of the motor away from the limit switch 177 allowing it to move to its normally closed position and thus establish a holding circuit for the relay 165. Since the timing circuit is initiated manually or automatically for a momentary period, the relay will remain energized as the motor makes a complete rotation moving the tray 60 from a rest position to a sample-taking position and back to a rest position at which point the limit switch 177 will be engaged and the normally closed contact 177 opened, deenergizing the relay and the motor 115. It will be recognized that the other types of control may be applied to the motor to vary the timing operation of the same. With this improved sampling device, only the limit switch 177 controlling or limiting the motor 115 to a single revolution of rotation is required. It will also be noted that oscillation of the sampling tray between sample-taking and rest positions occurs without interference of the shafts 142 to the discharge of the samples since they are located on the sides of the base portion or at the enlarged portions 72 thereof. Thus our improved bulk material sampler provides a simplified construction with a minimum of switching and without interference to the flow of material except during sample taking, such as not to injure or damage the material being conveyed. The oscillation of the sample tray about a line parallel to the direction of travel of the conveyor and across the entire width of the same insures the accuracy of the sample at a minimum disturbance to the flow of bulk material through the sampling device.

While our improved sampling device may take variations in materials and shape of parts, it will be recognized that such changes may be made within the scope of the present invention. Therefore we wish to be limited only by the appended claims.

What is claimed is:

1. A bulk material sampler including, a platform adapted to be positioned in a bulk material conveying line, an open top receiving hopper positioned on said platform, a continuous type belt conveyor positioned at and forming a floor for said hopper, roller means journaled in said platform and mounting said belt type conveyor and including motor means connected to at least one roller of the roller means for continuously moving the belt type conveyor, said conveyor extending partially over the extent of the platform and including a discharge opening at one end of said platform, guide means positioned below said belt type conveyor and extending beyond the discharge opening from said end of said platform underneath the conveyor, a sample tray slidably mounted in said guide means, motor means mounted on said platform and connected to said sample tray to oscillate said tray back and forth from a position beneath said discharge opening to a position under said belt conveyor, and a sample hopper positioned under said belt conveyor and adjacent said sample tray on said guide means when it is positioned beneath the conveyor such as to receive bulk material from the tray.

2. The bulk material sampler of claim 1 in which the continuous belt type conveyor is made of a flexible material and includes upwardly and transversely extending flanges of flexible material positioned thereon.

3. The bulk material sampler of claim 2 in which the sample tray is of the same width dimension as the width of the belt type conveyor and is positioned and slidably mounted beneath the same.

4. The bulk material sampler of claim 3 in which the continuous belt type conveyor is positioned on the platform in an inclined position with the discharge end above the floor of the hopper.

5. The bulk material sampler of claim 4 in which the motor means connected to and reciprocating the sample tray includes an eccentric arm and a pivoted linkage system mounted on the platform and connected to the sample tray by drive shafts which move the tray along the guide means in an oscillating manner from a position beneath the discharge opening of the bulk material conveyor to a position beneath the bulk material conveyor and adjacent the sample hopper.

6. The bulk material sampler of claim 5 in which the guide means includes guide rails positioned on the platform and beneath the conveyor parallel thereto and a fixed portion extending between the guide rails with a flexible rubber covering positioned on the sample tray and the fixed portion to provide a discharge path to the sample hopper.

7. The bulk material sampler of claim 6 in which the sample tray includes an open extremity for the discharge of sample material therefrom at the extremity closest to the sample hopper and with a raised lip extremity at the opposite extremity to insure receipt of the material from the conveyor as a sample is being taken.

8. A bulk material sampler including, a conveyor for material having an inlet and an outlet extremity, a sample tray having the same width as the conveyor and open at one extremity, a guide platform including rails mounting the sample tray for oscillatory movement beneath the conveyor from a position under the outlet extremity to a position beneath the conveyor, hopper means for collecting samples from the sample tray through the open extremity of the same when the tray is positioned beneath the conveyor, said means being fixed with respect to the sample tray on the guide means, and means connected to the sample tray for reciprocating the same back and forth in alignment with and in the direction of travel of the conveyor.

9. The bulk material sampler of claim 8 in which the conveyor and the sample tray have a rubber covering to prevent damage to the material being sampled and conveyed.

References Cited by the Examiner
UNITED STATES PATENTS

| | | | |
|---|---|---|---|
| 1,860,107 | 5/1932 | Lien | 73—421 |
| 2,310,819 | 2/1943 | Van Orden | 198—193 |

EVON C. BLUNK, *Primary Examiner.*

A. C. HODGSON, *Assistant Examiner.*